Patented June 16, 1953

2,642,425

UNITED STATES PATENT OFFICE 2,642,425

PROCESS FOR RECOVERING ROSIN

Owen S. Eckhardt and Ismond E. Knapp, Columbia, Miss., assignors to Leach Brothers, Inc., a corporation of Wisconsin No Drawing. Application August 5, 1949, Serial No. 108,858

3 Claims. (Cl. 260—108)

Our invention relates to a new and improved process for recovering wood rosin from solutions containing complex mixture of wood rosin, rosin color bodies, oxidized rosin and the like. It is especially concerned with increasing the recovery of pale rosin from so-called "B solutions" and for obtaining rosin of good color from "B wood resin."

The details of our invention and the advantages thereof may perhaps best be described and understood in the light of comparison with existing practices in the art which latter may initially be briefly outlined.

Wood rosin is conventionally produced by extracting pine stump wood with a solvent, usually a light petroleum solvent, and recovering the rosin from the extract solution by evaporating the solvent. The wood rosin thus obtained is ruby red in color and, because of this dark color, it is not suitable for many industrial uses such as high grade soaps, paper sizing for white paper, pale varnishes, synthetic resins, etc.

It is known in the art to decolorize wood rosin by dissolving the dark wood rosin in an organic solvent, most commonly petroleum naphtha, and then percolating the resulting solution through beds of granular fuller's earth, activated bentonite, magnesium silicate or other suitable adsorbents. The color bodies, oxidized rosin, and other dark colored impurities are adsorbed on the adsorbent and the effluent from the percolation beds or towers is a solution of decolorized rosin in the organic solvent, from which the decolorized or pale rosin is recovered by evaporation of the solvent. The adsorbents found suitable for industrial use have the power of adsorbing not only the color bodies, oxidized rosin, and other impurities but they have the disadvantage of adsorbing the pure resin acids themselves. Apparently, the adsorbent becomes saturated first with the crude or impure rosin as a whole. Since the adsorbent has a preferential affinity for the color bodies, oxidized resin acids, and other dark colored impurities, the pale rosin which is first adsorbed on the surface and/or in the pores of the adsorbent is displaced by the color bodies as the percolation is continued. Eventually, if the percolation were continued long enough, the adsorbent would become completely saturated with color bodies, but, in actual industrial practice, the percolation is discontinued before this point is reached. The result is that, at the end of a percolation cycle, the adsorbent holds on its surface and/or in its pores color bodies and other impurities together with a very considerable proportion of rosin.

It is customary in the industry to use antigravity percolation so that the adsorption towers are full of liquid at all times. At the end of a percolation cycle the solution in the tower contains undecolorized rosin at the bottom where the raw solution enters the towers and partially decolorized rosin at the top of the tower. It is customary to displace at least a part of this solution by pumping fresh naphtha into the bottom of the tower. Since the fresh naphtha has a lower density than the rosin-naphtha solution remaining in the tower, diffusion occurs and the displacement of the rosin solution is by no means complete. The solution thus displaced is either added to the pale rosin solution or is run back into the stock solution of FF rosin for subsequent percolation.

After the adsorbent has become partially saturated with color bodies and other impurities, the percolation is discontinued and the adsorbent is customarily revivified by treating it with a solvent which dissolves the adsorbed color bodies and rosin off the adsorbent and thus reconditions it for further use. Various solvents are known for use in this revivifying step as, for example, the lower alcohols, particularly ethyl alcohol and isopropyl alcohol, as well as acetone, methyl ethyl ketone, and the like. In this procedure, the solvent, for example, hot ethyl alcohol, is pumped into the bottom of the tower. Soon after the flow of alcohol is begun, the valves in the effluent line are adjusted so that the effluent from the tower is collected in a so-called "B solution" tank. As the ethyl alcohol rises through the bed of adsorbent, it dissolves the color bodies and other rosin impurities off the adsorbent. It also dissolves whatever rosin may be present in the pores of the adsorbent. The ethyl alcohol is pumped into the tower until the removal of the adsorbed material is practically complete. After this step in the process the tower is full of ethyl alcohol. Fresh hot naphtha is then pumped into the tower to displace the alcohol. This is followed by cold naphtha and the naphtha pumping is continued until the effluent from the top of the tower shows no test for alcohol. At this point the tower is considered to be completely revivified and is ready to be cut back into the percolation cycle.

During the revivification procedure there is obtained in the effluent a complex solution of rosin color bodies and other rosin impurities, together with a variable percentage of good rosin, in a solvent mixture of both ethyl alcohol and naphtha. In this mixed solvent the ratio of naphtha to ethyl alcohol will usually vary between say 3:1 and 6:1. It is customary to refer to this solution as "B solution," and the dark colored resinous material that is obtained by the evaporation of this solution is known in industry as "B wood resin." Although it contains a very considerable percentage of rosin, the U. S. Department of Agriculture has ruled that it cannot be labelled or shipped in interstate commerce as a rosin but must be called "B wood resin."

Various methods of handling the "B solution" are known to those skilled in the art. It is common, for example, to run said "B solution" through suitable stills or evaporators to recover all the solvent overhead and then withdrawing the molten residue as "B resin." Under these conditions, the combined solvents are separated by some suitable method, such as, for example, by adding water and decanting the naphtha from the aqueous ethyl alcohol layer, or by extracting the ethyl alcohol from the mixed solvents by means of a glycol, or by some other means of separation. Another known method of handling the "B solution" is to heat it in a suitable still and recover, first, a constant-boiling mixture or azeotrope of ethyl alcohol and naphtha. Ordinarily, there is a relatively large excess of naphtha in the "B solution" and, under these conditions, all of the ethyl alcohol comes over in a constant boiling mixture having a percentage composition of between about 30 per cent and 50 per cent ethyl alcohol and the balance naphtha. The exact composition of this azeotrope varies with the type of naphtha used and it also depends on the particular alcohol used, for example, whether ethyl or isopropyl alcohol. After the azeotrope has all distilled over, there remains in the still the "B resin" together with the excess of undistilled naphtha. Usually, the distillation is continued and this naphtha, which is free from alcohol, is collected separately, leaving "B wood resin" as the residue.

The "B wood resin" obtained in the manner just described contains a relatively large percentage of rosin. This is shown by the fact that from 25 to 60 per cent of it is soluble in naphtha whereas the rosin color bodies and oxidized rosin acids are insoluble in naphtha. Whatever rosin is present in the "B wood resin" represents a serious loss in the decolorization process as a whole because the actual yield of pale rosin is lower than the potential yield by the amount of rosin present in the "B wood resin." For example, a decolorization process may be operated to yield say 80 per cent of pale rosin and 20 per cent of "B wood resin." The latter may contain say 55 per cent of naphtha-soluble material. This would represent 11 per cent of the original rosin put through the process, and therefore, the potential yield of pale rosin would be 80+11=91 per cent. The pale grades of wood rosin always command a much higher price than the FF grade. Furthermore, a very few industrial uses have been found for "B wood resin" even at extremely low prices. It is evident, therefore, why efforts have been directed for many years to increase the yield of pale rosin by producing a "B wood resin" containing the lowest possible percentage of naphtha-soluble material.

It is, accordingly, an object of our invention to produce a "B wood resin" containing a very low percentage of naphtha-soluble material.

It is a further and important object of our invention to increase the percentage of pale rosin obtainable by the decoloration of FF wood rosin over and above that ordinarily obtained in the industry by heretofore known procedures.

We have discovered a new and useful method of operation by which the yield of pale rosin is extremely high and, at the same time, the "B wood resin" produced contains an unusually low percentage of naphtha-soluble material. Our invention also relates to the recovery of rosin of good color from "B wood resin" produced in accordance with known methods in the process of recovering wood rosin from pine stump wood.

The first step in the practice of our invention, where the "B solution" is being treated, is to remove the alcohol or the like from the "B solution" by distilling off a constant boiling mixture of, for example, ethyl alcohol and naphtha, if those are the particular solvents which have been utilized in the process from which the "B solution" results. The distillation is continued until the azeotrope has ceased to distill, as shown by the fact that the vapor temperature rises to the boiling point of the naphtha itself. When this point has been reached, the distillation is discontinued. The contents of the still are immediately transferred to a suitable settling tank or separator, either by gravity flow through suitable pipes and valves or by means of a pump in conventional manner. The mixture of naphtha, color bodies, rosin impurities, and other resinous material is allowed to stand for several hours and is cooled, preferably to room temperature, say 20 to 35 degrees C. or lower. This can be accomplished in any one of several different ways. The settling tank may, for example, be equipped with cooling coils through which cold water or refrigerated brine is circulated, or a spray of cold water may be allowed to impinge on the surface of the settling tank. Other methods of cooling this mixture will be apparent to one skilled in the art. The cooling step is one of the essential steps in our invention but the particular method by which the cooling is effected is not essential. As a result of this cooling, the color bodies, oxidized rosin acids and other impurities which are not soluble in naphtha settle out and leave a clear solution of good rosin in naphtha. This solution is then decanted or pumped out of the settling tank into a suitable storage tank to be further processed as described below.

After this naphtha solution of rosin, hereinafter referred to as "recovered rosin solution," has been drawn off from the settling tank, the insoluble material, i. e., the color bodies, oxidized rosin acids and other impurities, is melted, preferably by means of steam coils, and is drawn off, preferably into a pot still where it is sparged with jet steam to remove any occluded naphtha. The "B resin" thus obtained contains only a relatively very small proportion, usually of the order of 5 to 7 per cent, of material that is soluble in naphtha. In this respect, it is quite different from the ordinary "B wood resin" heretofore produced in the industry, and for some uses it is more desirable and valuable by virtue of its low content of naphtha-soluble material. This is particularly true when the "B wood resin" is to be used, for example, as a component in low priced protective coatings which must be resistant to petroleum oils.

The "recovered rosin solution" which is drawn off from the settling tank in the manner described above contains rosin in varying amounts depending on several factors, chief of which is the volume of naphtha that was used in revivifying the percolation tower. The concentration of rosin in this solution will ordinarily be between 0.2 and 0.6 pound per gallon of solution. While the rosin may be recovered directly from such a solution by evaporation procedures, we have found it to be more desirable that this solution be used in the preparation of additional FF rosin solution from which pale rosin is ultimately recovered. Ordinarily, the concentration of FF rosin in the solution going into the percolation towers is between approximately 0.8 and 1.4 pounds per gallon. The "recovered rosin solution" may be fortified by adding FF rosin to it until the desired concentration is obtained, or alternatively, a solution of FF rosin in naphtha may be prepared at a relatively high concentration, say 1.7 pounds per gallon for example, and then this solution may be diluted with the "recovered rosin solution" until a solution is obtained which has the desired rosin concentration. In either case, the rosin solution thus prepared can be run through the percolation towers and the yield and quality of the pale rosin obtained is fully equivalent to that obtained from an equal quantity of straight FF wood rosin in solution when percolated in the same manner.

The rosin in the "recovered rosin solution" represents a direct saving. In the processes ordinarily used in the industry, this rosin is lost in the "B wood resin." By means of our invention, this rosin is saved and is converted into pale rosin, thus increasing the yield very markedly. In fact, where FF rosin is decolorized by our improved process, the yield of pale rosin is much higher than that obtained by any hitherto known process.

The following examples are illustrative of the practice of our invention. It will be understood that various changes may be made, in relation to selection of organic solvents, proportions of ingredients, temperatures, selection of adsorbents, and the like, within the scope of the guiding principles disclosed herein and without departing from the essential teachings encompassed in our invention.

*Example I*

(a) A solution of FF wood rosin in petroleum naphtha was prepared at elevated temperature and, when it was cooled to room temperature, a small quantity of insoluble material settled out and was removed. The solution, upon analysis, showed 13.4 gms. of rosin per 100 ml., this being equivalent to approximately 1.1 pounds of rosin per gallon.

(b) 7.5 liters of the FF rosin solution of part (a) (equivalent to about 1000 gms. of rosin) was percolated through a bed of fuller's earth, 16/30 mesh, in a small cylinder or tower. At the end of the percolation, fresh petroleum naphtha was run through the tower to displace most of the rosin solution. The effluent from the tower was run to a small evaporator where the naphtha was distilled off, leaving 842 gms. of pale rosin grading "N," according to the rosin colored standards established by the U. S. Department of Agriculture. The bed of fuller's earth, which now contained the color bodies as well as some rosin, was revivified by first running through it preheated revivification solvent. The composition of this solvent was 40 per cent isopropyl alcohol and 60 per cent petroleum naphtha by volume. This hot solvent dissolved the color bodies off the fuller's earth, as shown by the very dark color of the effluent. Hot naphtha and then cold naphtha were run through the tower to displace the revivification solvent. The last naphtha through was colorless and showed a negative test for isopropyl alcohol. The combined effluent from this revivification procedure consisted of the dark colored solution of color bodies in the revivification solvent together with the displacement naphtha and is referred to as "B solution." This "B solution" was distilled slowly through a fractionating column ("Widmer" type). A constant boiling mixture of isopropyl alcohol and naphtha came over at a temperature of 73.5 degrees C. in the vapor. This temperature remained constant within 1 degree C. until all of the isopropyl alcohol had come over. Then the temperature rose very rapidly to 99 degrees C., and the naphtha distilling at that temperature showed a negative test for isopropyl alcohol. At this point, the distillation was discontinued and the contents of the still was transferred to a small settling tank where it was allowed to cool to room temperature by standing over night. The cooled naphtha solution was decanted from the insoluble residue. Its volume amounted to 2.68 liters and, on evaporating a small sample, it showed a rosin content of 2.80 gms. per 100 ml. This means that there was a total of 75 gms. of rosin in this "recovered rosin solution."

The insoluble residue was melted and sparged with a jet of carbon dioxide to remove any occluded naphtha. The final yield was 82 gms. of "B resin." This was blacker than the "B resin" obtained in a conventional procedure known in the art. Moreover, the "B resin" obtained pursuant to this Example I showed only 5.2% soluble in naphtha compared with 54.4% soluble in naphtha of a "B resin" made in accordance with heretofore known practices.

*Example II*

In this Example II, the "recovered rosin solution" from Example I was utilized. A solution of FF rosin in naphtha was prepared as described in part (a) of Example I except that after cooling and settling the solution showed a concentration of 20 gms. of rosin per 100 ml. 4625 ml. of this latter rosin solution, containing 925 gms. of rosin, was mixed with the 2680 ml. of "recovered rosin solution" obtained in Example I to make 7305 ml. of rosin solution containing a total of about 1000 gms. of rosin. This was diluted with 195 ml. of fresh naphtha to make a total volume of 7500 ml. This solution was percolated through the granular fuller's earth as in Example I to yield 843 gms. of "N" grade rosin. The revivification was also conducted exactly as described in Example I and the "recovered rosin solution" amounted to 2800 ml. having a concentration of 2.60 gms. of rosin per 100 ml. which is equivalent to a total of 73 gms. of recovered rosin. The "B wood resin" recovered weighed 81 gms.

*Example III*

This was a check run on Example II. The 2800 ml. of "recovered rosin solution" containing 73 gms. of rosin was mixed with 4635 ml. of FF rosin solution, prepared as described in part (a) of Example I, having a concentration of 20 gms. of rosin per 100 ml. and, therefore, containing 927 gms. of rosin. This made a total of about 1000 gms. of rosin put through the percolation tower. The procedure was exactly the same as that described in Example I. There was obtained 840 gms. of "N" grade rosin, 82 gms. of "B wood resin" and 2750 ml. of "recovered rosin solution" having a concentration of 2.76 gms. per 100 ml.

and, therefore, containing a total of 76 gms. of recovered rosin.

The yields obtained in the foregoing examples may be summarized as follows:

| Example No. | Rosin Input | | | Rosin Yields | | | Total acctd. for gms. | Yields calculated as a percentage of the FF rosin input | |
|---|---|---|---|---|---|---|---|---|---|
| | FF, gms. | Recovered Rosin, gms. | Total, gms. | Pale, gms. | Recovered Rosin, gms. | B, gms. | | Pale | B |
| (¹) | 1,000 | | 1,000 | 840 | | 158 | 998 | 84.0 | 15.8 |
| I | 1,000 | | 1,000 | 842 | 75 | 82 | 999 | 84.2 | 8.2 |
| II | 925 | 75 | 1,000 | 843 | 73 | 81 | 997 | 91.1 | 8.75 |
| III | 927 | 73 | 1,000 | 840 | 76 | 82 | 998 | 90.7 | 8.85 |

¹ In accordance with known prior process, not a part of present invention.

The results obtained in these examples show the remarkable effects of our invention in the operation of the rosin decolorization process. The yield of pale rosin is increased to over 90 per cent of the FF rosin input. This is much higher than the yield obtained by any other known process of which we are aware. Concomitantly the quantity of "B wood resin" produced in the process is reduced to approximately half that obtained by various hitherto known processes.

*Example IV*

This example illustrates the application of our invention to the recovery of pale rosin from a typical "B wood resin" of industry.

200 gms. of commercial "B wood resin" was pulverized and dissolved in 4 liters of a hot mixed solvent consisting, by volume, of 40% anhydrous isopropyl alcohol and 60 per cent petroleum naphtha (boiling range 95–115 degrees C.). This solution was diluted with 4 liters of petroleum naphtha and the resulting solution was run into a still and distilled slowly through a fractionating column. The temperature in the vapor held within the approximate range 73–75 degrees C. until 3950 ml. of distillate had been collected; then the temperature rose rapidly to 98.5 degrees C. while an additional 40 ml. came over. At this point the naphtha distilling showed a negative test for alcohol.

The distillation was then discontinued and the contents of the still were transferred quickly to a 5-liter flask and allowed to cool to room temperature by standing over night. The supernatant liquid was then drawn off and the insoluble residue was melted and sparged with carbon dioxide to yield 115 gms. of very dark high-melting resinous material.

On analysis, the supernatant liquid that had been drawn off showed a rosin concentration of 2.11 gms. per 100 ml. Since its total volume amounted to 4000 ml., the total quantity of rosin in this solution amounted to 84.4 gms., which is equivalent to 42.2% of the original "B wood resin." This solution was decolorized by percolation through a tower of fuller's earth, as described in the foregoing examples, and yielded 64 gms. of pale rosin grading "M."

Where naphtha and an alcohol, for example, ethyl alcohol or isopropyl alcohol, are utilized as the solvent mixture, the ratio of the naphtha to the alcohol should be at least 2 to 1 and preferably somewhat greater, for example, about 3 to 1 to about 6 to 1, in order to obtain proper separation of the undesired color bodies, oxidized rosin and other impurities insoluble in naphtha in the settling step of the method.

What we claim as new and desire to protect by Letters Patent of the United States is:

1. In a method of increasing the recovery of pale rosin from "B solutions" containing naphtha and lower alcohol solutions of rosin, "B wood resin" and miscellaneous impurities and wherein the ratio of the naphtha to the lower alcohol is at least 2 to 1, the steps which include distilling off an azeotropic mixture of the naphtha and alcohol substantially until the azeotropic mixture ceases to distill, promptly transferring the residue to a settling tank and allowing the same to stand therein while cooling it to a temperature below approximately 35 degrees C. whereby undesired color bodies, oxidized rosin acids and other impurities insoluble in naphtha settle out, removing the resulting clear solution of rosin in naphtha, and recovering desired pale rosin from said solution.

2. In a method of increasing the recovery of pale rosin from "B solutions" containing naphtha and ethyl alcohol solutions of rosin, "B wood resin" and miscellaneous impurities and wherein the ratio of the naphtha to the ethyl alcohol is at least 2 to 1, the steps which include distilling off an azeotropic mixture of the naphtha and ethyl alcohol substantially until the azeotropic mixture ceases to distill, promptly transferring the residue to a settling tank and allowing the same to stand therein while cooling it to a temperature below approximately 35 degrees C. whereby undesired color bodies, oxidized rosin acids and other impurities insoluble in naphtha settle out, and removing the resulting clear solution of rosin in naphtha.

3. In a method of increasing the recovery of pale rosin from "B solutions" containing naphtha and isopropyl alcohol solutions of rosin, "B wood resin" and miscellaneous impurities and wherein the ratio of the naphtha to the isopropyl alcohol is at least 2 to 1, the steps which include distilling off an azeotropic mixture of the naphtha and isopropyl alcohol substantially until the azeotropic mixture ceases to distill, promptly transferring the residue to a settling tank and allowing the same to stand therein while cooling it to a temperature below approximately 35 degrees C. whereby undesired color bodies, oxdized rosin acids and other impurities insoluble in naphtha settle out, and removing the resulting clear solution of rosin in naphtha.

OWEN S. ECKHARDT.
ISMOND E. KNAPP.

References Cited in the file of this patent

UNITED STATES PATENTS

| Number | Name | Date |
|---|---|---|
| 934,257 | Yaryan | Sept. 17, 1909 |
| 1,505,438 | Sherwood et al. | Aug. 19, 1924 |
| 1,794,537 | Palmer | Mar. 3, 1931 |
| 2,193,026 | Hall | Mar. 12, 1940 |
| 2,209,545 | Toby | July 30, 1940 |